United States Patent [19]
Owens et al.

[11] Patent Number: 5,968,565
[45] Date of Patent: Oct. 19, 1999

[54] METHODS FOR IMPROVING MEAT TENDERNESS

[75] Inventors: Fredric N. Owens; Donald R. Gill; J. Brad Morgan, all of Stillwater, Okla.

[73] Assignee: The Board of Regents for Oklahoma State University, Stillwater, Okla.

[21] Appl. No.: 09/121,585

[22] Filed: Jul. 23, 1998

Related U.S. Application Data

[60] Provisional application No. 60/053,769, Jul. 25, 1997.

[51] Int. Cl.⁶ ...................................................... A23K 1/18
[52] U.S. Cl. ............................................. 426/2; 426/807
[58] Field of Search ......................................... 426/2, 807

[56] References Cited

U.S. PATENT DOCUMENTS

| | | | |
|---|---|---|---|
| 2,496,634 | 2/1950 | Melnick | 99/2 |
| 2,685,517 | 8/1954 | Dunmire | 99/11 |
| 3,600,189 | 8/1971 | Raynal | 99/6 |
| 4,224,349 | 9/1980 | Gooch et al. | 426/281 |
| 4,336,271 | 6/1982 | Kang et al. | 426/55 |
| 4,582,708 | 4/1986 | Tipton et al. | 426/62 |
| 4,617,294 | 10/1986 | Krivak et al. | 514/52 |
| 5,043,170 | 8/1991 | Borenstein et al. | 426/73 |
| 5,219,596 | 6/1993 | Smith et al. | 426/2 |
| 5,366,736 | 11/1994 | Edwards, Jr. | 424/442 |
| 5,393,535 | 2/1995 | Kjems | 424/678 |
| 5,505,968 | 4/1996 | Schaefer et al. | 424/442 |
| 5,516,525 | 5/1996 | Edward, Jr. | 424/442 |
| 5,532,008 | 7/1996 | Sasaoka et al. | 426/73 |

OTHER PUBLICATIONS

Koohmaraie M.: "Role of the neutral proteinases in post-mortem muscle protein degradation and meat tenderness"; Reciprocal Meat Conference Proceedings; vol. 45, 1992, pp. 63–71 XP002086431.

Database WPI. Section Ch, Week 7813. Derwent Publications Ltd., London, GB. Class C03, AN 78–24343A. XP002086432. & JP 53 017178 A (Kurokawa S). Feb. 16, 1978. see abstract.

*Primary Examiner*—Chihaya D. Sayala
*Attorney, Agent, or Firm*—Fellers, Snider, Blankenship, Bailey & Tippens, P.C.

[57] ABSTRACT

A method for increasing the tenderness of livestock meat tissues. The method involves increasing the calcium concentration in livestock muscle tissue prior to harvest of the animal to a degree sufficient to activate or enhance post-mortem tenderization mechanisms. This is accomplished, most preferably, through the administration of Vitamin D, its analogs or derivatives, or combinations thereof, to livestock at concentrations above those required nutritionally in order to decrease shear force (increase tenderness) of meat tissues.

13 Claims, 1 Drawing Sheet

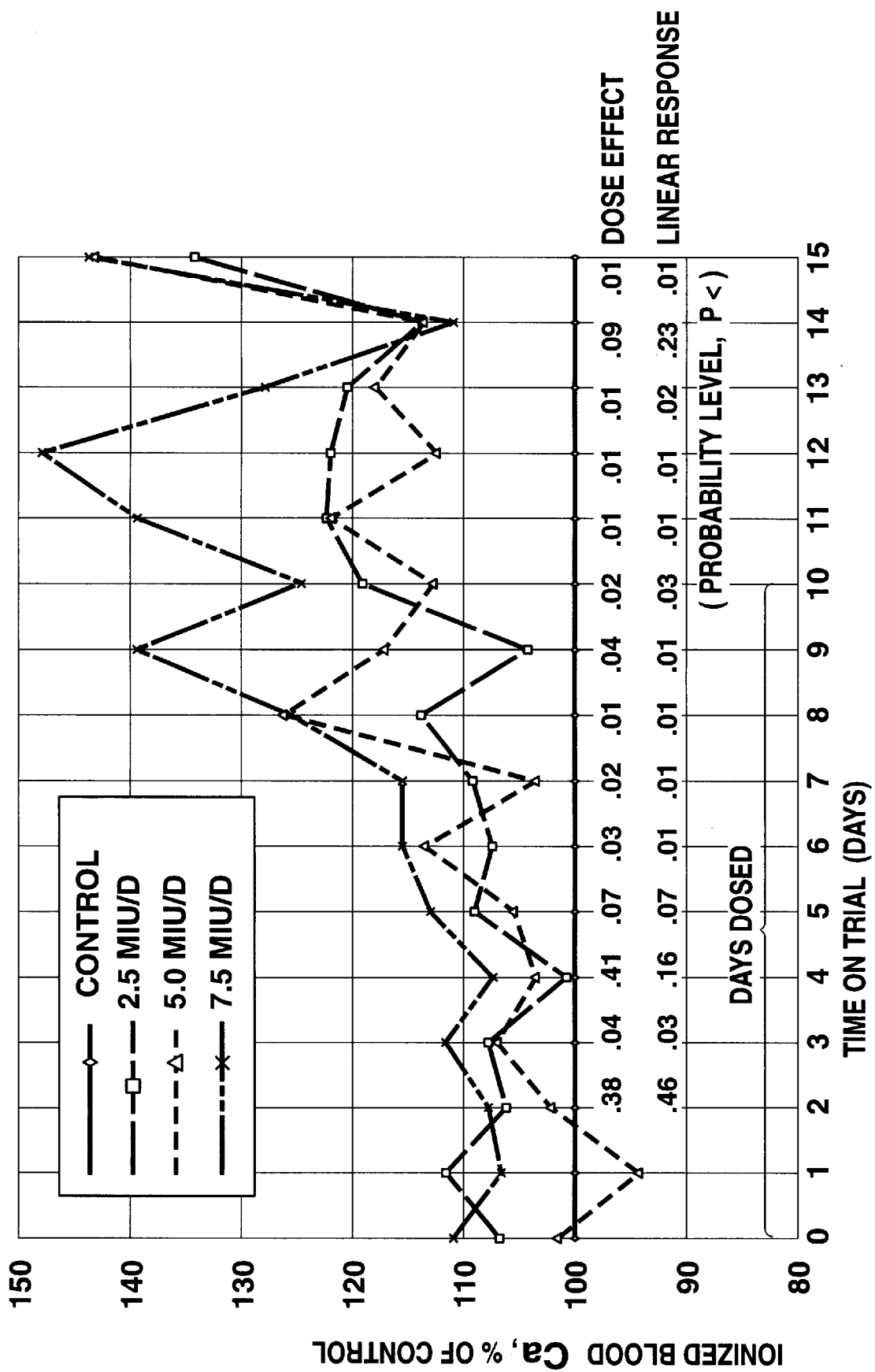

METHODS FOR IMPROVING MEAT TENDERNESS

This application claims the benefit of copending U.S. Provisional Patent Application Ser. No. 60/053,769, filed 25 Jul. 1997.

BACKGROUND OF THE INVENTION

1. Field of Invention

The present invention relates generally to improving the tenderness of meat, and, more specifically, to methods for improving meat tenderness through the use of hypercalcemic agents to activate or enhance postmortem tenderization mechanisms.

2. Background

Recent surveys have indicated that an excessive amount of variation exists in the tenderness of beef cuts at the retail and food service levels (Morgan et al., 1991; Hamby, 1992). In fact, the latest National Beef Quality Audit ranked inadequate tenderness as the second most important beef quality problem (Smith et al., 1995). It is estimated that the annual economic loss associated with beef toughness equals $7.64 per animal or $217.0 million to the U.S. beef industry. Thus, the National Cattlemen's Beef Association (NCBA, 1995) listed development of a procedure or instrument that can improve and/or predict beef tenderness as a high-priority issue within the U.S. beef industry.

In the past, attempts at tenderizing meat have involved extended holding times or aging of meat postmortem in a controlled, refrigerated environment. Davey and Gilbert (1969) first provided evidence that associated the involvement of calcium ions with the process of postmortem aging of meat. Busch et al. (1972) later demonstrated that the presence of calcium induced myofibril fragmentation and that process in turn was hindered by the addition of a calcium chelator. Many subsequent efforts have focused on the relationship between postmortem storage and the activities of the calpain protease system (i.e., $\mu$- and m-calpain and their endogenous inhibitor, calpastatin) (for review see Koohmaraie, 1992). Because the activity of m-calpain remains nearly constant throughout postmortem storage, and there is a progressive decrease in the activity of $\mu$-calpain, Koohmaraie et al. (1987) suggested that $\mu$-calpain, not m-calpain, was involved in postmortem aging. However, when sufficient calcium ions are present, both calpain proteases are activated and each undergoes autolysis. Therefore, the rapid loss of $\mu$-calpain during postmortem storage (Koohmaraie et al., 1987) is a good indicator that $\mu$-calpain, unlike m-calpain, is activated during normal postmortem conditions. Koohmaraie et al. (1989) validated this theory when ovine carcasses infused with calcium chloride solution produced meat which was tender after only 1 day of postmortem aging. These results led to the development of the calcium-activated tenderization (CAT) system in which pre-rigor or postrigor meat is injected with a calcium chloride solution, which in turn activates the both calpain proteases and results in enhanced meat tenderness (Wheeler et al. 1991, 1992, 1993, 1994, and 1997).

Currently, there is a debate on how calpain proteases could possibly function in muscle tissue since the calcium requirements for proteolytic activity of these enzymes (approximately 10 $\mu$M for $\mu$-calpain and approximately 200–300 $\mu$M for m-calpains) are much higher than the free calcium concentrations found in living muscle tissue (<1 $\mu$M). While the concentration of free calcium in resting muscle is low, postmortem muscle calcium concentrations can reach 100 $\mu$M as a result of the release of calcium ions from mitochondrial and sarcoplasmic reticulum reserves. Previous studies (Koohmaraie et al., 1987; Vidalenc et al., 1983; Ducastaing et al., 1985) have indicated that under normal postmortem conditions, m-calpain is remarkably stable, whereas there is a gradual decline in the activities of $\mu$-calpain, and calpastatin loses its activity rapidly. Both $\mu$- and m-calpain undergo autolysis in the presence of sufficient calcium with the eventual loss of activity (Suziki et al., 1981; DeMartino et al., 1986; Koohmaraie et al., 1989). Secondly, elevation of calcium, which results in accelerated postmortem proteolysis and tenderization process, also accelerates the process of calpastatin inactivation (Koohmaraie et al., 1988; 1989).

Attempts have been made to elevate muscle calcium concentrations through dietary calcium supplementation and/or infusion of a calcium chloride solution to a live animal, but since blood calcium homeostasis is regulated very closely (8–12 mg/dL in cattle) these attempts have resulted in limited success. Accordingly, prior methods proposed for improving tenderness generally have involved mechanical, chemical or enzyme application to the meat tissue. Such systems are costly and raise consumer concerns about food adulteration and allergic reactions. Pre-harvest infusions of calcium mixtures directly into the blood stream immediately pre-slaughter will improve meat tenderness, but such administration is complex to control.

It is accordingly an object of the present invention to provide a method for increasing the tenderness of livestock meat tissues that is easy to accomplish, commercially practicable, and which does not raise consumer concerns.

BRIEF SUMMARY OF THE INVENTION

The present invention provides a method for increasing the tenderness of livestock meat tissues which achieves the desired objectives. It involves increasing the calcium concentration in livestock muscle tissue prior to harvest of the animal to a degree sufficient to activate or enhance postmortem tenderization mechanisms. This is accomplished, most preferably, through the administration of Vitamin D, its analogs or derivatives, or combinations thereof, to livestock at concentrations above those required nutritionally in order to decrease shear force (increase tenderness) of meat tissues. As it relates to beef cattle, the most preferred embodiment comprises administering 100,000 to 1,000,000 IU of Vitamin $D_3$ per kilogram of diet consumed (1–10 million IU daily) to finishing steers for up to 10 days immediately prior to harvest in order to obtain the desired results.

Studies were undertaken in connection with the present invention to determine 1) the effectiveness of supplemental vitamin $D_3$ (VITD$_3$) on altering plasma and muscle calcium levels, 2) whether VITD$_3$ supplementation decreases Warner-Bratzler shear (WBS) force values of steaks from feedlot beef steers, and 3) the tenderness response curve in VITD$_3$ supplemented longissimus muscle steaks. In Experiment 1, 20 crossbred steers were assigned randomly to one of four treatment diets consisting of either 0, 2.5, 5.0 or 7.5 million IU of VITD$_3$ per day for 10 days. Blood samples were obtained daily during this supplementation period and 5 days thereafter (days 11–15). Results suggested that between day 6 through day 13 a linear increase (P<0.01) in ionized plasma calcium concentrations was observed in steers supplemented with VITD$_3$. Compared to non-supplemented steers, ionized plasma calcium concentrations of the steers receiving 7.5 million IU of VITD$_3$ per day were increased between 30% and 50%. In Experiment 2, longissimus dorsi samples from crossbred steers (n=118) which were supplemented with either 0 or 5 million IU of $VITD_3$ per day for 7 days were obtained and aged for 7, 14, or 21 days. Following the initial 7-day postmortem aging period, $VITD_3$ supplementation lowered (P<0.01) WBS valves (0.58 kg) and increased sensory tenderness rating (0.6 units) when compared to cuts originating from non-supplemented steers. In Experiment 3, 44 steers were supplemented with either 0 or 7.5 million IU of $VITD_3$ per day for 10 days immediately prior to harvesting. Results indicated that 1) plasma and longissimus dorsi calcium concentrations were higher (P<0.05) for steers that received supplemental $VITD_3$; 2) compared with non-supplemented cuts, $VITD_3$ supplementation decreased WBS valves of cuts aged for 7-, 14- and 21-days (P<0.02, P<0.07 and P<0.13, respectively); and 3) sensory panelists preferred samples from $VITD_3$ supplemented steers. Activation of calpain proteases may be responsible for the observed tenderization due to the supplementation of $VITD_3$.

A better understanding of the present invention and its objects and advantages will become apparent to those skilled in this art from the following detailed description, taken in conjunction with the attached figure, wherein there is shown and described only the preferred embodiments of the invention, simply by way of illustration of the best mode contemplated for carrying out the invention. As will be realized, the invention is capable of modifications in various obvious respects, all without departing from the invention. Accordingly, the description should be regarded as illustrative in nature and not as restrictive.

BRIEF DESCRIPTION OF THE DRAWINGS

The Figure is a graphical representation of the temporal effects of vitamin $D_3$ supplementation (0, 2.5, 5.0 or 7.5 million IU/day) on ionized blood calcium concentration of steers in Experiment 1. Probabilities represent significance levels of the plasma response to vitamin $D_3$ (dose effect) and of the linear response to vitamin $D_3$ dosage (linear response).

DETAILED DESCRIPTION OF THE PREFERRED EMBODIMENT

Before explaining the present invention in detail, it is important to understand that the invention is not limited in its application to the details and steps described herein. The invention is capable of other embodiments and of being practiced or carried out in a variety of ways. It is to be understood that the phraseology and terminology employed herein is for the purpose of description and not of limitation.

The preferred embodiment of the invention improves meat tenderness in animals through increasing the free calcium concentration in muscle in an animal prior to harvest to a degree sufficient to activate or enhance postmortem tenderization mechanisms, i.e., to a degree sufficient, it is believed, to active both $\mu$-calpain and m-calpain proteases. In the most preferred aspect of the invention, the free calcium concentration in muscle is increased by administering to the animal for a time prior to harvest an amount above that required nutritionally of Vitamin D, analogs or derivatives of Vitamin D, or combinations thereof, and, particular, the form of Vitamin D known as Vitamin $D_3$.

Vitamin D is known as the "sunshine vitamin" because the skin synthesizes cholecalciferol (vitamin $D_3$ or "VITD3") when exposed to ultraviolet light. Previous research has demonstrated that $VITD_3$ increases plasma calcium concentration by stimulating intestinal calcium absorption (Nicolaysen, 1937), mobilizing calcium from previously formed bone mineral (Carlsson, 1952), and through 1,25-dihydroxyvitarnin $D_3$ which increases renal reabsorption of calcium from the kidney (Sutton and Dirks, 1978). In fact, it has been shown that a relationship between low blood serum calcium levels and the activation of 1,25-dihydroxyvitamin $D_3$ exists in that feeding low calcium diets stimulated the formation of 1,25-dihydroxyvitamin $D_3$ which in turn promoted the mobilization of calcium from bones (DeLuca, 1979; Sutton et al., 1977; Kleeman et al., 1961). Mobilizing calcium as a result of Vitamin D administration has been performed as a means to prevent parturient paresis in lactating dairy cows. It was concluded that orally administered vitamin D at 5 million IU daily for 2 weeks prepartum increased serum calcium 2.1 mg/dL compared to control animals (Hibbs et al., 1951). Hibbs and Pounden (1955) observed that oral supplementation of 5, 10, 20 and 30 million IU of vitamin D for 3 to 8 days prepartum increased serum calcium concentrations by 1.9, 1.0, 1,9 and 2.3 mg/dl, respectively. Single injections of la-hydroxyvitamnin $D_3$ (500 or 700 $\mu$g) alone or in combination with 25-hydroxyvitamin $D_3$ (4 mg) increased serum calcium concentrations 1.8 to 2.4 mg/dL 3 to 8 days after injection (Bar et al., 1985, 1988; Sachs et al., 1987; Hodnett et al., 1992).

In addition to mobilizing calcium, it has recently been discovered that $VITD_3$ stimulates the influx of calcium in skeletal muscle cells through the activation of calcium channels. Vazquez et al. (1997) performed a series of experiments and concluded that calcium release-activated calcium channels participate in the rapid modulation of calcium entry in animal cells by 1,25-dihydroxyvitamin $D_3$. It appears that $VITD_3$ and its derivatives actually stimulate calcium mobilization as well as its entry in skeletal muscle cells.

The desirability of providing cattle with increased calcium is discussed in U.S. Pat. No. 5,393,595 to Kjems. Kjems discusses a composition containing a calcium ion which comprises a water-in-oil emulsion which is orally administrable and palatable to cows for preventing milk fever. The composition further comprises a calcium salt that is dissolved in the aqueous phase to form an aqueous phase solution containing a calcium ion. The invention also includes the method of orally administering the composition to cows to treat milk fever.

The concept of providing animals with high dosages of a Vitamin $D_3$ metabolite for increasing calcium utilization so that less dietary calcium is required is discussed in U.S. Pat. Nos. 5,366,736 and 5,516,525 to Edwards, Jr. Additionally, the benefits of providing animal feed compositions with a Vitamin D metabolite for the purpose of promoting eggshell and bone strength in egg-laying hens is discussed in U.S. Pat. No. 5,043,170 to Bornstein et al.

While others have investigated providing cattle with increased calcium, or increasing calcium utilization through Vitamin D supplementation, for the purpose of, among other things, preventing milk fever in cattle or parturient paresis in lactating dairy cows, the pre-harvest administration of Vitamin $D_3$ to beef cattle in amounts above that required nutritionally for a time period sufficient to activate or enhance postmortem tenderization mechanisms presents a novel approach to improving meat tenderness.

As used herein the phrase "in an amount above that required nutritionally" means an amount more than that amount defined by the National Research Council as being required nutritionally in an animal's diet. For beef cattle, this figure is about 275 IU per kilogram of diet. An amount more that 500 IU per kilogram of diet for any animal should be considered for the purpose of the present invention to be an amount above that required nutritionally.

Vitamin $D_3$, or cholecalciferol, is normally synthesized in the skin of animals and people from an inactive precursor, 7-dehydrocholesterol, by reactions that are promoted by exposure to the ultraviolet component of sunlight. It is also abundant in fish-liver oils. The other common form is Vitamin $D_2$, or ergocalciferol, a commercial product made by ultraviolet irradiation of ergosterol of yeast. Vitamin $D_3$ itself is not biologically active, but it is the precursor of, among other metabolites, 1,25-dihydroxycholecalciferol. Vitamin $D_3$ is metabolized first by the hydroxylation at the $C_{25}$ position to 25-hydrocholecalciferol by one or more liver enzymes, followed by the hydroxylation of 25-hydrocholecalciferol at the $C_1$ position to 1,25-dihydroxycholecalciferol (also known as calcitriol) by one or more enzymes present in the kidneys. As used herein, the term "Vitamin D," when left unqualified, means either of the two commons forms of the vitamin. The term "analog" as used herein in reference to Vitamin D refers to chemical compounds structurally similar to either of the common forms of Vitamin D but which differ slightly in composition (as in the replacement of one atom by an atom of a different element or in the presence of a particular functional group). The term "derivative" as used herein in reference to Vitamin D refers to chemical substances related structurally to the two common forms of Vitamin D and theoretically derivable from it. More particularly, the term "derivative" includes hydroxylated metabolites of Vitamin D, and specifically Vitamin $D_3$, such as 1-hydroxycholicalciferol, 25-hydrocholecalciferol, 1,25-dihydroxycholecalciferol, 24,25-dihydroxycholecalciferol, 1,24,25-trihydroxycholecalciferol, 1,25-dihydroxy-24-fluorocholecalciferol, and 1,25-dihydroxy-26,27-hexadeuterocholecalciferol.

The Vitamin $D_3$ derivatives described herein can be prepared by known procedures, including the teachings of the following references which are mentioned in Cols. 5 and 6 of U.S. Pat. No. 5,366,736 and which are incorporated herein by reference: 1,25-dihydroxycholecalciferol can be prepared as described in *Biochemistry* 10(14), 2799 (1971), and U.S. Pat. Nos. 4,310,467 and 3,697,559; 1,25-dihydroxy-26,27-hexadeuterocholecalciferol can be prepared as described for the synthesis of 1,25-dihydroxycholecalciferol in *Tet. Let.* 40, 4147 (1972), with the substitution of a trideuteromethyl Grignard reagent in place of the methyl Grignard reagent used to add the carbons at the 26 and 27 positions; 1-hydroxycholecalciferol can be prepared by the methods described in *J. Am. Chem. Soc.* 95(8), 2748 (1973) and U.S. Pat. No. 3,741,996; 1,24,25-trihydroxycholecalciferol can be prepared by the method described in U.S. Pat. No. 3,847,955; 1,25-dihydroxy-24-fluorocholecalciferol can be prepared by the procedure described in *J Org. Chem.*, 53(5), 1040 (1988); 25-hydroxycholecalciferol can be prepared as described in U.S. Pat. Nos. 4,310,467 and 3,565,924. The chemical structures of 7-dehydrocholesterol, Vitamin $D_3$ (cholecalciferol), 1,25-dihydroxycholecalciferol (calcitriol), 1-hydroxycholicalciferol, 25-hydrocholecalciferol, 24,25-dihydroxycholecalciferol, 1,24,25-trihydroxycholecalciferol, 1,25-dihydroxy-24-fluorocholecalciferol, and 1,25-dihydroxy-26,27-hexadeuterocholecalciferol are shown in FIGS. 2 and 3 of U.S. Pat. No. 5,366,736, said patent and figures also being incorporated herein by reference.

An effective dosage of Vitamin D, its analogs or derivatives, or combinations thereof, for the enhancement of meat tenderness is an amount which is above that required nutritionally and which activates or enhances postmortem tenderization mechanisms. The dosage is preferably fed to an animal in a feed composition for a predetermined time prior to harvest. To ensure consumption of the entire dosage, the animal may be fed a lesser volume diet during the supplementation period. It will be understood by those skilled in the art that the supplement could also be administered as a water supplement or by injection, but for convenience intake with feed compositions is preferred.

The primary use of the present invention is believed to reside in the pre-harvest treatment of beef cattle, although the invention is not limited to use with this animal, and, in its most preferred embodiment involves the oral administration of Vitamin D, its analogs or derivatives, and combinations thereof, for a time prior to harvest in an amount above that required nutritionally for beef cattle. The acceptable dosage range to achieve the desired results in beef cattle is believed to be between 100,000 and 1,000,000 IU per kilogram of diet consumed, or, expressed as a daily intake, 1–10 million IU daily. The length of time in which the dosage should be administered is dependent upon both the dosage amount and the method of administration. For the preferred oral administration and without limiting the breadth of this present invention, 3 days of the preferred dose most likely constitutes the minimum length of administration, while lower doses may be administered over the course of a month or longer. When administered parenterally, however, desired results may be achieved in six hours or less in some cases. More specifically, the most preferred embodiment for beef cattle encompasses administering a dosage of 100,000 to 1,000,000 IU of Vitamin $D_3$ per kilogram of diet (1–10 million IU daily) to an animal for up to 10 days prior to harvest. Administration of this dosage at this dosing schedule has been shown to activate or enhance postmortem tenderization mechanisms thereby improving meat tenderness.

The preferred agent for oral administration is a feedstuff constituting grower or finishing rations and containing 100,000 to 1,000,000 IU per kilogram of Vitamin D, its analogs or derivatives or combinations thereof. Grower or finishing rations means typical feedlot feedstuffs including roughages, such as hay or silage, and concentrates such as grains (corn, barley, milo, rye, oats and wheat), and mixtures thereof, along with molasses and other supplements and additives.

The present invention will be further understood with reference to the following non-limiting experimental examples.

Experimental Examples

An Animal Use and Care Committee approved the use and treatment of animals in these studies according to guidelines established by Oklahoma State University.

Experiment 1: Twenty crossbred steers (550 kg mean weight) were assigned randomly to one of four treatments. Steers were individually fed 1.5% of their body weight and supplemented with 0, 2.5, 5.0 or 7.5 million IU of vitamin $D_3$ per day for 10 days with 5 steers per dose level. Blood samples were obtained daily during this supplementation period and 5 days thereafter. Blood plasma samples were analyzed for ionized calcium using a Orion calcium ion selective electrode (Orion Research, Boston, Mass.). Ionized blood calcium concentrations for treatment groups were calculated.

Experiment 2: Two sets of crossbred steers (n=20, Angus× Hereford $F_1$ crossbreds and n=98, Salers or Charolais sire to Brangus dams) had ad libitum access to a high-energy density diet for 140 days before slaughter. One-half of the steers were supplemented with 5 million IU of vitamin $D_3$ per day for 7 days immediately prior to harvesting. The steers were harvested using an approved humane technique, and plasma from blood samples obtained during exsanguination were analyzed for calcium, magnesium, triglyceride, glucose, chlorine, phosphorus, sodium and potassium using a Roche Cobas Mira device (Roche Diagnostic Systems, Nutley, N.J.). Following a 36 hour chilling period (at −1° C.), carcasses were ribbed and USDA quality and yield grade information were recorded. After collection of grade information, one strip loin was removed from each carcass. Five steaks (2.54 cm thick) were fabricated from each strip loin subprimal. The first steak was aged for 7 days postmortem and used for trained sensory evaluation, the second, third and fourth steaks were aged for 7, 14 and 21 days, respectively, and used for Warner-Bratzler shear force determination and the fifth steak was used for total muscle calcium determination. The steaks used for Warner-Bratzler shear force and sensory panel determinations were individually packaged and frozen at −20° C. For each trait, only the longissimus dorsi was evaluated.

Steaks for Warner-Bratzler shear force and sensory evaluation were thawed to 2° C. then broiled on an impingement oven to an internal temperature of 70° C. Warner-Bratzler shear force was conducted as described by Wheeler et al. (1995). The cooked steaks were cooled to 20° C., and then six 1.27-cm-diameter cores were removed parallel to the muscle fiber orientation. Cores were sheared once each on an Instron Universal Testing Machine model 1135 (Instron, Canton, Mass.) with a standard Warner-Bratzler attachment and 5 cm/min crosshead speed.

Cooked steaks for trained sensory evaluation were held at 70° C. for up to 10 minutes before they were cut into 1 cm×1 cm×1 cm cubes and served warm to an eight-member sensory panel trained according to Cross et al. (1978). Each panelist independently evaluated two cubes from each sample for juiciness, beef flavor intensity, tenderness, and connective tissue amount using 8-point scales (8=extremely juicy, intense, tender, none; 1=extremely dry, bland, tough, abundant) and off-flavor on a 4-point scale (4=none, 1=intense). Scores for each sample were the mean of the scores for all eight panelists. Each session was initiated with a warm-up sample.

Total calcium content of muscle samples was measured using procedures described by Nakamura (1973). Upon completion of the digestion process, the amount of $Ca^{2+}$ was measured with an atomic absorption spectrophotometer (Model D 951, Lexington, Mass.).

Experiment 3: Forty-four crossbred steers were supplemented with either 0 or 7.5 million IU VITD per day for 10 days immediately prior to harvesting humanely. Blood and strip loin samples were collected from each carcass and processed as described in Experiment 2.

At 24-hours postmortem, activities of μ-calpain, m-calpain and calpastatin were determined on unfrozen longissimus muscle according the procedures of Koohmaraie (1990) with slight modifications. To determine calpain protease activities, longissimus samples (20 g) were homogenized in 2.5 vol of extraction buffer (50 mM Tris, 10 mM EDTA and 30 mM β-mecaptoethanol [MCE], pH 8.3) and shipped on ice to the Food Processing Center at Oklahoma State University for measurements of calpains. The samples were then centrifuged, filtered, and dialyzed overnight (40 mM Tris, 5 mM EDTA, and 10 mM MCE, pH 7.5). After dialysis the samples were centrifuged, filtered, and loaded gravimetrically onto anion-exchange columns (DEAE-Sephacel; Sigma Chemical, St. Louis, Mo.). The columns were washed with elution buffer (50 mM Tris, 1 mM EDTA, and 10 mM MCE, pH 7.5) and eluted using a linear NaCl gradient (25 to 350 mM) in elution buffer. Activities of the calpains were determined using a casein solution (100 mM Tris, 1 mM $NaN_3$, 5 mM $CaCl_2$, 5 mg/mL casein, and 1 μL/mL MCE, pH 7.5). One unit of calpain activity was defined as the amount of enzyme necessary to cause an increase of 1.0 optical density unit at 278 nm in 1 hour at 25° C. Quanitification of calpastatin was accomplished using a slightly modified procedure developed and verified by Shackelford et al. (1994). Briefly, a 5 g longissimus muscle sample was extracted in 20 mL of extraction buffer (150 mM TRIS, 10 mM EDTA, and 7 mM MCE, pH 8.3) by homogenizing for 3×30 seconds with a polytron with a 30-second rest between each burst. The homogenate was centrifuged for 1 hour at 30,000×g and the supernatant fluid was filtered through cheesecloth. The supernatant fluid was transferred into 13- ×100-mm borosilicate test tubes and heated in a water bath (95° C.) for 15 min to denature calpains. Following heating, samples were chilled on ice for 15 minutes. Following centrifugation (for 30 minutes at 6,000×g.), the volume of supernatant fluid was determined and recorded for subsequent calculation of calpastatin. One unit of calpastatin activity was defined as the amount of inhibitor necessary to inhibit one unit of DEAE-purified m-calpain activity.

Statistical Analysis: For blood plasma calcium concentration data from Experiment 1 single df contrasts were used to determine effects of supplementing $VITD_3$ and whether the response was linearly related to dosage. Samples from Experiment 2 were considered to be blocked by set of steers (Set 1 and 2) and breed of sire (Salers or Charolais sire in set 2). Lavene's test was performed to test for heterogeneity of variances among the group by treatment combinations. Variance was not heterogeneous according to that test. Levene's test was performed to test for heterogeneity of variances among 12 groups by treatment combinations. Variance was not heterogeneous according to that test. Carcass and palatability data were analyzed using the general linear model procedure of SAS (1985) using pen (rep*treatment) as the error term. For Experiment 3, harvest date was considered as two blocks. The mixed model procedure of SAS (1985) was used to analyze carcass, palatability and protease.

Results

The principle objective of Experiment 1 was to determine if $VITD_3$ supplementation altered blood calcium concentrations compared to levels from non-supplemented steers. Mean concentrations of ionized blood calcium from $VITD_3$ supplemented steers plotted as a percentage of those of control steers are shown in FIG. 1. As a result of $VITD_3$ supplementation, blood ionized calcium increased linearly (P<0.04) between day 6 and day 13. This noticeable increase in blood ionized calcium level was additionally observed (P<0.01) on day 15 for steers which were supplemented with $VITD_3$. Steers supplemented with 7.5 million IU of $VITD_3$ per day exhibited blood calcium levels that were between 40% to 50% greater when compared to calcium levels from non-supplemented control animals. These results are similar to earlier studies which involved the supplementation of $VITD_3$ aiding the prevention of parturient paresis in lactating dairy cows (Hibbs et al., 1951).

Sample statistics of carcass characteristics as impacted by VITD$_3$ supplementation of both Experiments 2 and 3 are presented in Table 1. Because VITD$_3$ supplemented steers in the two studies were only treated for a 7- or 10-days period prior to harvesting, respectively, carcasses from each experiment had similar (P>0.05) mean values for all carcass traits. It should be mentioned that the carcasses sampled in Experiments 2 and 3 had carcass characteristics similar to those as evaluated in the National Beef Quality Audit (Boleman et al., 1998).

TABLE 1

Least squares means for the main effect of treatment on sample carcass traits from Vitamin D$_3$ supplemented steers in Experiments 2 and 3

| Trait | Control | VITD$_3$ | SEM | (P<) |
|---|---|---|---|---|
| Experiment 2[a] | | | | |
| Steers, n | 59 | 59 | | |
| Carcass weight, kg | 336.2 | 326.4 | 3.53 | .08 |
| Adj. fat thickness, cm | 1.03 | 0.99 | .11 | .35 |
| Longissimus area, cm$^2$ | 86.2 | 84.1 | 0.80 | .08 |
| Internal (KPH) fat, % | 1.9 | 1.8 | 0.06 | .39 |
| USDA Yield Grade | 2.40 | 2.40 | 0.08 | .91 |
| Skeletal Maturity[c] | 148 | 146 | 2.4 | .43 |
| Lean Maturity[d] | 136 | 140 | 2.4 | .30 |
| Marbling score[e] | 300 | 295 | 9.0 | .70 |
| Experiment 3[b] | | | | |
| Steers, n | 22 | 22 | | |
| Carcass weight, kg | 358.5 | 368.4 | 7.6 | .38 |
| Adj. fat thickness, cm | 1.00 | 1.00 | .10 | .15 |
| Longissimus area, cm | 92.5 | 90.0 | 2.5 | .50 |
| Internal (KPH) fat, % | 2.0 | 2.3 | .17 | .20 |
| USDA Yield Grade | 2.2 | 2.6 | .19 | .09 |
| Skeletal Maturity[c] | 130 | 125 | 3.95 | .35 |
| Lean Maturity[d] | 185 | 178 | 10.9 | .62 |
| Marbling score[e] | 384 | 434 | 18.0 | .06 |

[a]Animals fed vitamin D were supplemented with 5 million IU per day for a total of 7 days
[b]Animals fed vitamin D were supplemented with 7.5 million IU per day for a total of 10 days
[c]Skeletal maturity: 100 to 199 = A maturity.
[d]Lean maturity: 100 to 199 = light cherry red, fine in texture.
[e]Marbling score: 300–399 and 400–499 = "slight" and small degree of marbling, respectively.

As was the case in Experiment 1, blood plasma profile results from Experiment 2 indicated that VITD$_3$ supplementation elevated (P<0.03) calcium concentration compared to non-supplemented controls (Table 2). It should be highlighted that once again a similar increase (approximately 20%) in blood calcium concentration was observed when 5 million IU of VITD$_3$ were supplemented to finishing steers 7 days prior to their scheduled harvest date. In addition to an elevation in calcium concentrations, VITD$_3$ supplementation resulted in decreased (P<0.001) magnesium levels compared to non-supplemented controls. No differences (P>0.05) were observed for blood plasma triglyceride, glucose, chloride, phosphorous, sodium or potassium levels between VITD$_3$ supplemented and control steers.

TABLE 2

Least squares means for blood plasma samples for steers supplemented with either 0 or 5 million IU of Vitamin D$_3$ for 7 days prior to slaughter.

| | Treatment | | | |
|---|---|---|---|---|
| Item | Control | VITD$_3$ | SEM | (P < 1) |
| Steers, n | 10 | 10 | | |
| Ca, mg/dL | 9.23 | 12.39 | 0.29 | .03 |
| Mg, meq/L | 1.99 | 1.46 | 0.06 | .001 |
| Triglyceride, mg/dL | 22.5 | 26.9 | 2.20 | .21 |
| Glucose, mg/dL | 153.6 | 200.2 | 38.0 | .42 |
| Cl, mM | 103.6 | 104.0 | 1.1 | .79 |
| P, mg/dL | 6.66 | 6.36 | 0.15 | .20 |
| Na, mM | 149.2 | 148.0 | 1.5 | .58 |
| K, mM | 7.22 | 6.77 | 0.44 | .50 |

VITD$_3$ supplementation (5.0 million IU per day for 7 days) resulted in elevated (P<0.05) muscle calcium concentration ($\mu$g/g of wet tissue) compared with control muscle tissue (Table 3). Longissimus muscle cuts from VITD$_3$-supplemented animals displayed improved (P<0.01) shear force values at days 7 compared with cuts from control carcasses. However, no differences (P>0.05) in shear force rating were noticed when meat samples were aged for 14 or 21 days postmortem. To compare the two supplementation groups with respect to their conformance to desired specifications for beef tenderness, a threshold value of 4.6 kg was chosen for shear force value (Shackelford et al., 1991a), recognizing that absolute shear force values may differ between research locations. Data showing the percentage of steers in each group failing to meet this criterion after 7, 14 or 21 days of postmortem aging are presented in Table 3. After 7 days of postmortem aging, approximately half (56.0%) of all control cuts failed to meet the shear force threshold compared to approximately a third (34.2%) of the strip loin cuts from VITD$_3$ supplemented steers. However, extending the postmortem aging time to either 14 or 21 days negated (P>0.05) any advantageous effect associated with VITD$_3$ supplementation.

TABLE 3

Least squares means for the main effect of treatment on longissimus muscle calcium content, Warner-Bratzler shear force, and sensory traits of vitamin D$_3$ supplemented steers from Experiment 2.

| | Treatment | | | |
|---|---|---|---|---|
| Item | Control | VITD$_3$ | SEM | (P < 1) |
| Steers, n | 59 | 59 | | |
| Ca, $\mu$g/g | 13.9 | 19.9 | 2.7 | .05 |
| Shear force, d 7 | 4.70 | 4.12 | .08 | .01 |
| Shear force, d 14 | 4.03 | 3.87 | .09 | .25 |
| Shear force, d 21 | 3.58 | 3.60 | .11 | .90 |
| Shear force > 4.6 kg, d 7 | 56.0 | 34.2 | 5.5 | .01 |
| Shear force > 4.6 kg, d 14 | 20.0 | 17.0 | 7.2 | .78 |
| Shear force > 4.6 kg, d 21 | 6.0 | 8.0 | 4.8 | .77 |
| Juiciness[8] | 5.46 | 5.76 | .14 | .31 |
| Tenderness[a] | 4.77 | 5.53 | .06 | .02 |
| Connective tissue amount | 7.04 | 6.99 | .07 | .54 |
| Beef flavor intensity[a] | 5.84 | 6.02 | .11 | .28 |
| Off-flavor[b] | 3.88 | 3.75 | .03 | .78 |

[a]8 = extremely juicy, tender, none detected, intense to 1 = extremely dry, tough, abundant arnount, bland.
[b]4 = none detected to extreme off-flavor.

In the present study, VITD$_3$ supplementation had a highly significant (P<0.02) effect on trained sensory tenderness ratings (Table 3). Compared to the "slightly-tender" panel tenderness ratings received by steaks from VITD$_3$ supplemented carcasses, strip loin steaks from control carcasses received "slightly-tough" ratings. No detectable differences (P>0.05) were observed in sensory scores related to juiciness, connective tissue amount, beef flavor intensity and off-flavor were detected between steaks from VITD$_3$ supplemented and control carcasses.

In Experiment 3, VITD$_3$ supplementation (7.5 million IU per day for 10 days) to finishing steers resulted in elevated (P<0.02) muscle calcium concentration compared to non-supplemented tissue levels (Table 4). Strip loin cuts from VITD$_3$ supplemented cattle displayed day 7 shear force values approximately 1 kg lower (17.9% reduction) than those of control cuts. As a result of a higher VITD$_3$ dosage level (5 million versus 7.5 million IU per day) as well as an extended supplementation period (7 days versus 10 days), beef tenderness benefits from Experiment 3 tended (P<0.10) to remain apparent even following extended postmortem aging periods of 14 and 21 days postmortem. This was evident due to a reduction in shear force (approximately 0.6 kg) and by the improved percentage of steaks from carcasses of VITD$_3$ supplemented steers meeting the shear force conformance specification of 4.6 kg (Table 4).

TABLE 4

Least squares means for the main effect of treatment on longissimus muscle calcium content, Warner-Bratzler shear force, and calpastatin activities of vitamin D$_3$ supplemented steers from Experiment 3.

| | Treatment | | | |
|---|---|---|---|---|
| Item | Control | VITD$_3$ | SEM | (P < 1) |
| Steers, n | 22 | 22 | | |
| Ca, $\mu$g/g | 14.2 | 21.3 | 1.8 | .02 |
| Shear force, d 7 | 5.13 | 4.21 | .28 | .02 |
| Shear force, d 14 | 4.40 | 3.81 | .25 | .07 |
| Shear force, d 21 | 4.04 | 3.44 | .24 | .13 |
| Shear force > 4.6 kg, d 7 | 55.8 | 39.2 | 9.6 | .23 |
| Shear force > 4.6 kg, d 14 | 47.5 | 24.2 | 9.4 | .09 |
| Shear force > 4.6 kg, d 21 | 32.5 | 10.0 | 8.5 | .07 |
| $\mu$-Calpain, activity/g | .56 | .19 | .04 | .05 |
| m-Calpain, activity/g | .99 | .62 | .07 | .07 |
| Calpastatin, activity/g | 4.83 | 4.11 | .31 | .04 |

Activities of muscle $\mu$-calpain, m-calpain and calpastatin measured at 24 hours postmortem from VITD$_3$ supplemented and control carcasses are reported in Table 4. Longissimus muscle samples from carcasses of VITD$_3$ animals had lower (P<0.05) $\mu$-calpain activities than controls. It may be noteworthy that in our study supplementation differences in m-calpain approached significance (P=0.0729) and were directionally consistent with supplementation differences in shear force values. Treatments also differed (P<0.04) in 24-hour longissimus calpastatin activity (control >VITD$_3$). Values for 24-hour calpastatin activity reported in our study are high compared with previously reported values (Shackelford et al., 1991b; Wheeler and Koohmaraie, 1992; Morgan et al., 1993). Shackelford et al. (1994) reported that the procedure used to quantify calpastatin activity in our study (heated calpastatin assay) produced higher activities than those determined by ion-exchange chromatography.

In the current investigation, VITD$_3$ supplementation increased longissimus muscle calcium concentration as much as a two-fold compared to control muscle calcium levels. When animals were supplemented with 7.5 million IU of VITD$_3$ for 10 days prior to harvest the amount of water-extractable calcium (assumed to be free calcium) in longissimus muscle was about 21 $\mu$g/g of tissue. This amount of free calcium corresponds to 0.53-mM calcium distributed in the muscle. This concentration should be sufficient to activate both $\mu$-calpain and m-calpain (Goll et al., 1985) and subsequently improve meat tenderness. From a very general point of view, it appears that VITD$_3$ supplementation may improve longissimus muscle tenderness and palatability traits in a mild but similar rendition of the CAT (i.e., calcium-activated tenderization) system. It appears that VITD$_3$ induced tenderization of meat is probably due to activation of calpain proteases, but other possible mechanisms cannot be ruled out.

In addition to supplying Vitamin D or its analogs or derivatives in food or water or by injection, other hypercalcemic agents or methods to induce hypercalcemia or elevated blood and muscle calcium concentrations might be used to obtain a similar result. These methods include altering the acid-base balance of blood through altering the dietary supply of an animal; absorption or retention of sodium through altering the dietary supply of an animal; and absorption or retention of sodium, potassium, chloride bicarbonate and sulfur. An additional method includes feeding specific plants that are naturally rich in or enriched with Vitamin D or its analogs, such as Solanum Malacoxylon, Trisetum Flavescens, or irradiated yeast. Additionally, altering blood concentrations of estrogen, parathyroid hormone or calcitonin through administration of these hormones directly or as a result of hormonal stimulants or depressants might be used to achieve the desired effect.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the claim or claims, including the fall range of equivalency to which each element thereof is entitled.

Bibliography

The following literature references are incorporated herein by reference:

Bar, A., R. Perlman and M. Sachs. 1985. Observation on the use of 1$\alpha$-Hydroxyvitamin D$_3$ in the prevention of bovine parturient paresis: The effect of a single injection on plasma 1$\alpha$-Hydroxyvitamin D$_3$, 1,25-Dihydroxyvitamin D$_3$, calcium, and hydroxyproline. J. Dairy Sci. 68:1952–1958.

Bar, A., S. Striem, R. Perlman and M. Sachs. 1988. Use of 1$\alpha$-Hydroxyvitamin D$_3$ in prevention of bovine parturient paresis. 8. Maternal and neonatal plasma calcium, parathyroid hormone, and vitamin D metabolites concentrations. J. Dairy Sci. 71:2723–2729.

Boleman, S. L., S. J. Boleman, W. W. Morgan, D. S. Hale, D. B. Griffin, J. W. Savell, R. P. Ames, M. T. Smith, J. D. Tatum, T. G. Field, G. C. Smith, B. A. Gardner, J. B. Morgan, S. L.

Northcutt, H. G. Dolezal, D. R. Gill, and F. K. Ray. 1998. National Beef Quality Audit - 1995: Survey of producer-related defects and carcass quality and quantity attributes. J. Anim. Sci. 76:96–103.

Busch, W. A., M. H. Stromer, D. E. Goll, and A. Suzuki. 1972. Ca$^{2+}$-specific removal of Z-lines from rabbit skeletal muscle. J. Cell Biol. 52:367–381.

Carlsson, A. 1952. Tracer experiments of the effect of vitamin D on the skeletal metabolism of calcium and phosphorus. Acta. Physiol. Scand. 26:212–220.

Cross, H. R., R. Moen, and M. S. Stanfield. 1978. Training and testing of judges for sensory analysis of meat quality. Food Technol. 32:48–54.

Davey, C. L., and K. V. Gilbert. 1969. Studies in meat tenderness. 7. Changes in the fine structure of meat during aging. J. Food Sci. 34:69–74.

DeLuca, H. F. 1979. Vitamin D: Metabolism and Function. Monographs of Endocrinology. Vol. 13. Springer-Vertag, New York.

DeMartino, G. N., C. A. Huff and D. E. Croall. 1986. Autoproteolysis of the small subunit of calcium-dependent protease II activates and regulates protease activity. J. Biol. Chem. 261:12047–12052.

Ducastaing, A., C. Valin, J. Schollmeyer and R. Cross. 1985. Effects of electrical stimulation on postmortem changes in the activities of two Ca-dependent neutral proteinases and their inhibitor in beef muscle. Meat Sci. 15:193–202.

Goll, D. E., T. Edmunds, W. C. Kleese, S. K. Sathe and J. D. Shannon. 1985. Properties of the Ca-dependent proteinase: In: E. A. Khairallah et al. (Ed.) Intracellular Protein Catabolism. Alan R. Liss Inc., New York.

Hamby, P. 1992. Palatability problems in restaurant beef. In: G.C. Smith (Ed.) The Final Report of the National Beef Quality Audit - 1991. Colorado State Univ., Fort Collins and Texas A&M University., College Station.

Hibbs, J. W., W. D. Pounden, and W. E. Krauss. 1951. Studies on milk fever in dairy cows. III.

Further studies on the effect of vitamin D on some of the blood changes at paurition and the composition of colostrum in normal and milk-fever cows. J. Dairy Sci. 34:855–864.

Hibbs, J. W., and W. D. Pounden. 1955. Studies on milk fever in dairy cows. IV. Prevention by short-time, prepartum feeding of massive doses of vitamin D. J. Dairy Sci. 38:65–72.

Hodnett, D. W., N. A. Jorgensen, and H. F. Deluca. 1992. 1α-Hydroxyvitamin $D_3$ plus 25-Hydroxyvitamin $D_3$ reduces parturient paresis in dairy cows fed high dietary calcium. J. Dairy Sci. 75:485–491.

Kleeman, C. R., D. Bernstein, R. Rockney, J. T. Dowling and M. H. Maxwell. 1961. Studies on the renal clearance of diffusible calcium and the role of the parathyroid glands in its regulation. In: The Parathyroids. (Ed: R. O. Greep and R. V. Talmage). pp. 353–387. Springfield.

Koohmaraie, M. 1992. Role of the neutral proteinases in postmortem muscle protein degradation and meat tenderness. Proc. Recip. Meat Conf. 45:63–71.

Koohmaraie, M., S. C. Seideman, J. E. Schollmeyer, T. R. Dutson, and J. D. Crouse. 1987. Effect of post-mortem storage on $Ca^{++}$-dependent proteases, their inhibitor and myofibril fragmentation. Meat Sci. 19:187–196.

Koohmaraie, M., J. D. Crouse and H. J. Mersman. 1989. Acceleration of postmortem tenderization in ovine carcasses through infusion of calcium chloride: Effect of concentration and ionic strength. J. Anim. Sci. 67:934–942.

Koohmaraie, M., and S. D. Shackelford. 1991. Effect of calcium chloride infusion of the tenderness of lambs fed a β-adrenergic agonist. J. Anim. Sci. 69:2463–2471.

Koohmaraie, M., G. Whipple, and J. D. Crouse. 1990. Acceleration of postmortem tenderization in lamb and Brahman-cross beef carcasses through infusion of calcium chloride. J. Anim. Sci. 68:1278–1283.

Koohmaraie, M., A. S. Babiker, R. A. Merkel and T. R. Duston. 1988. The role of calcium-dependent proteases and lysosomal enzymes in postmortem changes in bovine skeletal muscle. J. Food Sci. 53:1253–1257.

Koohmaraie, M. 1990. Quantification of $Ca^{2+}$-dependent protease activities by hydrophobic and ion-exchange chromotograghy. J. Anim. Sci. 68:659–665.

Morgan, J. B., J. W. Savell, D. S. Hale, R. K. Miller, D. B. Griffin, H. R. Cross and S. D. Shackelford. 1991. National beef tenderness survey. J. Anim. Sci. 69:3274–3283.

Morgan J. B., R. K. Miller, F. M. Mendez, D. S. Hale, and J. W. Savell. 1991. Using calcium chloride injection to improve tenderness of beef from mature cows. J. Anim. Sci. 69:4469–4476.

Morgan, J. B., T. L. Wheeler, M. Koohmaraie, J. D. Crouse and J. W. Savell. 1993. Effect of castration on myofibrillar protein turnover, endogenous proteinase activities, and muscle growth in bovine skeletal muscle. J. Anim. Sci. 71:408–414.

Nakamura, R. 1973. Estimation of water-extractable Ca in chicken breast muscle by atomic absorption. Anal. Biochem. 53:531–537.

NCA. 1995. NCA announces top priorities for 1995. National Cattlemen's Association, Washington, DC.

Nicolaysen, R. 1937. Studies upon the mode of action of vitamin D. III. The influence of vitamin D on the absorption of calcium and phosphrous in the rat. Biochem. J. 31:122–129.

Sachs M., R. Perlman, and A. Bar. 1987. Use of 1α-Hydroxyvitamin $D_3$ in the prevention of bovine parturient paresis. IX. Early and late effects of a single injection. J. Dairy Sci. 70:1671–1675.

SAS. 1985. SAS User's Guide: Statistics (Version 5 Ed.). SAS Inst. Inc., Cary, N.C.

Shackelford, S. D., J. B. Morgan, H. R. Cross and J. W. Savell. 1991a. Identification of threshold levels for Warner-Bratzler shear force in beef top loin steaks. J. Muscle Foods. 2:289–296.

Shackelford, S. D., M. Koohmaraie, G. Whipple, T. L. Wheeler, M. F. Miller, J. D. Crouse and J. O. Reagan. 1991b. Predictors of beef tenderness: Development and verification. J. Food Sci. 56:1130–1135.

Shackelford, S. D., M. Koohmaraie, L. V. Cundiff, K. E. Gregory, G. A. Rohrer and J. W. Savell. 1994. Heritabilities and phenotypic and genetic correlations for bovine postrigor calpastatin activity, intramuscular fat content, Warner-Bratzler shear force, retail product yield, and growth rate. J. Anim. Sci. 72:857–863.

Shackelford, S. D., T. L. Wheeler and M. Koohmaraie. 1997. Tenderness classification of beef: I. Evaluation of beef longissimus shear force at 1 or 2 days postmortem as a predictor of aged beef tenderness. J. Anim. Sci. 75:2417–2422.

Smith, G. C., J. W. Savell, H. G. Dolezal, T. G. Field, D. R. Gill, D. B. Griffin, D. S. Hale, J. B. Morgan, S. L. Northcutt, J. D. Tatum. 1995. The final report of the National Beef Quality Audit. Colorado State University, Fort Collins, Texas A&M University, College Station, and Oklahoma State University, Stillwater. NCA, Englewood, Colo.

Sutton, R. A. L., C. A. Harris, N. L. M. Wong, and J. Dirks. 1977. Effects of vitamin D on renal tubular calcium transport. In: Vitamin D: Biochemical, chemical and clinical aspects related to calcium metabolism. (Ed: A. W. Norman). pp.454–457. Berlin.

Sutton, R. A. L. and J. H. Dirks. 1978. Renal handling of calcium. Fed. Proc., Fed. Amer. Soc. Exp.Biol. 37:2112–2119.

Suzuki, K., S. Tsuji, S. Ishiura, Y. Kimura, S. Kobota and K. Imahori. 1981. Autolysis of calcium-activated neutral protease of chicken skeletal muscle. J. Biochem. 90:1787–1792.

USDA. 1989. Official United States Standards for Grades of Carcass Beef. AMS-USDA, Washington, DC.

Vazquez, G., A. R. de Boland, and R. Boland. 1997. Stimulation of $Ca^{2+}$ release-activated $Ca^{2+}$ channels as a potential mechanism involved in non-genomic 1,25 (OH)2-vitamnin $D_3$-induced $Ca^{2+}$ entry in skeletal muscle cells. Biochem. Biophys. Res. Commun. 239 (2):562–565.

Vidalenc, P., P. Cottin, N. Merdaci, and A. Ducastaing. 1983. Stability of two $Ca^{2+}$-dependent neutral proteinases and their specific inhibitor during postmortem storage of rabbit skeletal muscle. J. Sci. Food Agric. 34:1241–1250.

Wheeler, T. L., M. Koohmaraie, and J. D. Crouse. 1991. Effects of calcium chloride injection and hot boring on the tenderness of round muscles. J. Anim. Sci. 69:4871–4875.

Wheeler, T. L. and M. Koohmaraie. 1992. Effects of the β-adrenergic agonist L644,969 on muscle protein turnover, endogenous proteinase activities, and meat tenderness in steers. J. Anim. Sci. 70:3035–3043.

Wheeler, T. L., J. D. Crouse, and M. Koohmaraie. 1992. The effect of postmortem time of injection and freezing on the effectiveness of calcium chloride for improving beef tenderness. J. Anim. Sci. 70:3451–3457.

Wheeler, T. L., M. Koohmaraie, J. L. Lansdell, G. R. Siragusa, and M. F. Miller. 1993. Effects of postmortem injection time, injection level, and concentration of calcium chloride on beef quality traits. J. Anim. Sci. 71:2965–2974.

Wheeler, T. L., M. Koohmaraie and S. D. Shackelford. 1994. Reducing inconsistent beef tenderness with calcium-activated tenderization. Proc. Meat. Ind. Res. Conf., pp 119–130.

Wheeler, T. L., M. Koohmaraie, C. V. Cundiff and M. E. Dikeman. 1994. Effects of cooking and shearing methodology on variation in Warner-Bratzler shear force valves in beef. J. Anim. Sci. 72:2325–2330.

Wheeler, T. L., M. Koohmaraie and S. D. Shackelford. 1997. Effect of postmortem injection time and postinjection aging time on the calcium-activated tenderization process in beef. J. Anim. Sci. 75:2652–2660.

What is claimed is:

1. A method for improving meat tenderness in animals, comprising administering to said animal for a time prior to harvest an amount above that required nutritionally of Vitamin D, analogs or derivatives of Vitamin D, or combinations thereof.

2. The method according to claim 1, comprising administering the Vitamin $D_3$ form of Vitamin D.

3. The method according to claim 1 comprising orally administering said Vitamin D, analogs or derivatives of Vitamin D, or combinations thereof, to said animal.

4. A method for improving meat tenderness in animals comprising admninistering Vitamin $D_3$, analogs or derivatives of Vitamin $D_3$, or combinations thereof, to an animal in an amount above that required nutritionally by said animal for a time prior to harvest sufficient to activate or enhance postmortem tenderization mechanisms.

5. The method according to claim 4, wherein said derivatives of Vitamin $D_3$ comprise hydroxylated metabolites of Vitamin $D_3$.

6. The method according to claim 5, wherein said hydroxylated metabolites of Vitamin $D_3$ are selected from the group consisting of 1-hydroxycholicalciferol, 25-hydroxycholecalciferol, 1,25-dihydroxycholecalciferol, 24,25-dihydroxycholecalciferol, 1,24,25-trihydroxycholecalciferol, 1,25-dihydroxy-24-fluorocholecalciferol and 1,25-dihydroxy-26,27-hexadeuterocholecalciferol.

7. A method for improving meat tenderness in cattle, comprising administering to said animal for a time prior to harvest an amount above that required nutritionally of Vitamin D, analogs or derivatives of Vitamin D, or combinations thereof.

8. The method according to claim 7, comprising administering to said animal a dosage of 100,000 to 1,000,000 IU of Vitamin D, analogs or derivatives of Vitamin D, or combinations thereof, per kilogram of diet.

9. The method according to claim 8, comprising orally administering said dosage for a period of up to 10 days prior to harvest.

10. The method according to claim 9, comprising orally administering Vitamin $D_3$.

11. The method according to claim 7, comprising administering 1–10,000,000 IU daily of said Vitamin D, analogs or derivatives of Vitamin D, or combinations thereof.

12. A meat product produced from an animal treated in accordance with one of the methods of claims 1–3 and 7–10.

13. A composition for feeding to beef cattle comprising a feedstuff doped with 100,000 to 1,000,000 IU of Vitamin D, its analogs or derivatives, or combinations thereof, per kilogram of said feed stuff.

* * * * *